US011729121B2

(12) United States Patent
Yannam et al.

(10) Patent No.: US 11,729,121 B2
(45) Date of Patent: Aug. 15, 2023

(54) EXECUTING A NETWORK OF CHATBOTS USING A COMBINATION APPROACH

(71) Applicant: Bank of America Corporation, Charlotte, NC (US)

(72) Inventors: Ramakrishna R. Yannam, The Colony, TX (US); Priyank R. Shah, Plano, TX (US); Emad Noorizadeh, Plano, TX (US); Castigliana Cimpian, San Francisco, CA (US); Sushil Golani, Charlotte, NC (US); Hari Gopalkrishnan, Plainsboro, NJ (US)

(73) Assignee: Bank of America Corporation, Charlotte, NC (US)

( * ) Notice: Subject to any disclaimer, the term of this patent is extended or adjusted under 35 U.S.C. 154(b) by 34 days.

(21) Appl. No.: 17/243,738

(22) Filed: Apr. 29, 2021

(65) Prior Publication Data

US 2022/0353209 A1     Nov. 3, 2022

(51) Int. Cl.
*H04L 51/02* (2022.01)
*G06F 16/2455* (2019.01)
*G06F 9/54* (2006.01)

(52) U.S. Cl.
CPC .............. *H04L 51/02* (2013.01); *G06F 9/54* (2013.01); *G06F 16/24565* (2019.01)

(58) Field of Classification Search
CPC ....... H04L 51/02; G06F 9/54; G06F 16/2455; G06F 16/24565; G06F 17/278; G06F 17/2785; G06F 3/0484; G06F 3/0482; G06Q 20/0453; G06Q 20/1085

USPC ........................................................ 709/206
See application file for complete search history.

(56) References Cited

U.S. PATENT DOCUMENTS

| | | | |
|---|---|---|---|
| 10,762,581 B1* | 9/2020 | Dutt | G06F 16/3329 |
| 10,958,779 B1* | 3/2021 | Rule | H04M 3/54 |
| 11,005,997 B1* | 5/2021 | Deegan | H04L 51/216 |
| 11,093,708 B2* | 8/2021 | Swamypillai | G06F 40/205 |
| 2018/0357310 A1* | 12/2018 | Eidem | H04L 63/0457 |
| 2019/0124020 A1* | 4/2019 | Bobbarjung | H04L 51/02 |
| 2019/0180258 A1* | 6/2019 | Amar | H04L 51/02 |
| 2019/0199658 A1* | 6/2019 | Kim | H04L 51/214 |
| 2020/0137002 A1* | 4/2020 | Chavda | G06N 20/00 |
| 2020/0192976 A1* | 6/2020 | Swamypillai | H04L 51/02 |
| 2020/0334332 A1* | 10/2020 | Saha | G06F 40/35 |
| 2020/0342175 A1* | 10/2020 | Gadde | G06F 40/35 |
| 2020/0349614 A1* | 11/2020 | Batcha | H04M 3/5141 |

(Continued)

*Primary Examiner* — James N Fiorillo
(74) *Attorney, Agent, or Firm* — Weiss & Arons LLP

(57) ABSTRACT

A network of chatbots is provided. The network may include a user-facing router for receiving queries and a plurality of chatbots. Each chatbot included in the plurality of chatbots may identify a single logical grouping of a domain, identify a limited number of intents from each other chatbot included in the plurality of chatbots and communicate with each other chatbot included in the plurality of chatbots. When the router receives a query, the router may receive the query with an associated domain. The router may select a chatbot based on the received domain. The router may direct the query to the selected chatbot. The selected chatbot may determine that the domain associated with the query is incorrect. The selected chatbot may identify a second chatbot based on a hook included in the query and identified within the selected chatbot. The selected chatbot may transfer the query to the second chatbot.

15 Claims, 4 Drawing Sheets

CHATBOT ECOSYSTEM

(56) References Cited

U.S. PATENT DOCUMENTS

| | | | |
|---|---|---|---|
| 2020/0387550 A1* | 12/2020 | Cappetta | H04L 51/02 |
| 2021/0144107 A1* | 5/2021 | Liang | G06N 5/04 |
| 2021/0150150 A1* | 5/2021 | Wu | G06F 40/35 |
| 2021/0152508 A1* | 5/2021 | Willis | H04L 51/02 |
| 2021/0201238 A1* | 7/2021 | Sekar | H04M 3/5191 |
| 2021/0295203 A1* | 9/2021 | Liao | G06N 3/006 |
| 2021/0314282 A1* | 10/2021 | Sharma | H04L 65/65 |
| 2022/0068463 A1* | 3/2022 | Dolan | G06Q 50/01 |
| 2022/0115115 A1* | 4/2022 | Paredes Castro | G16H 10/20 |
| 2022/0171930 A1* | 6/2022 | Jalaluddin | G06F 40/279 |
| 2022/0171938 A1* | 6/2022 | Jalaluddin | G06F 40/289 |
| 2022/0171946 A1* | 6/2022 | Xu | H04L 51/02 |
| 2022/0229991 A1* | 7/2022 | Duong | G06N 20/00 |
| 2022/0414341 A1* | 12/2022 | Zotto | G06F 40/35 |
| 2023/0006947 A1* | 1/2023 | Yannam | G06F 16/90332 |

\* cited by examiner

EXECUTING A NETWORK OF CHATBOTS USING A COMBINATION APPROACH

FIELD OF TECHNOLOGY

Aspects of the disclosure relate to chatbots.

BACKGROUND OF THE DISCLOSURE

Chatbots are software used to automate conversations and interact with humans through various communication platforms. Chatbots may be powered by pre-programmed responses, artificial intelligence and/or machine learning in order to answer questions with or without contacting a live human agent. As such, chatbots can be used in lieu of providing direct contact with a live human agent. Chatbots may simulate conversations with a human using text, text-to-speech or speech-to-speech.

Many entities maintain a single chatbot. The single chatbot may include information relating to a specific domain of intents. For example, the entity may relate to selling furniture. As such, the chatbot may be trained to respond to information requests relating to furniture.

However, there are some entities that maintain multiple chatbots. Such entities may include various departments. Each department may maintain its own chatbot. However, although multiple chatbots may exist at a single entity, each chatbot must be accessed separately. In legacy chatbot applications, there is typically no communication between or among chatbots.

It would be desirable for seamless communication between chatbots.

SUMMARY OF THE DISCLOSURE

Apparatus, methods and processes for seamless communication between chatbots is provided. Such a process may include three steps. A first step may be to build a model. Such a model may include a network of chatbots, a communication protocol for communication between the chatbots within the network, a communication protocol for communication between the network of chatbots and a user and logical implementations for determining an intent to a user's query.

A second step may be to train the model. Training a model may include transmitting labeled training input, such as training queries and associated intents and/or domains, to the network of chatbots. The network of chatbots may process the training data in order to be able to comprehend production queries in real time.

A third step may be to use the model to process chat inputs. Processing the chat inputs may occur in real time at a production environment.

The system may be unconventional in multiple ways, such as the process in which the model is built, the process in which the model is trained, and various components included in the areas with which the model operates during execution.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
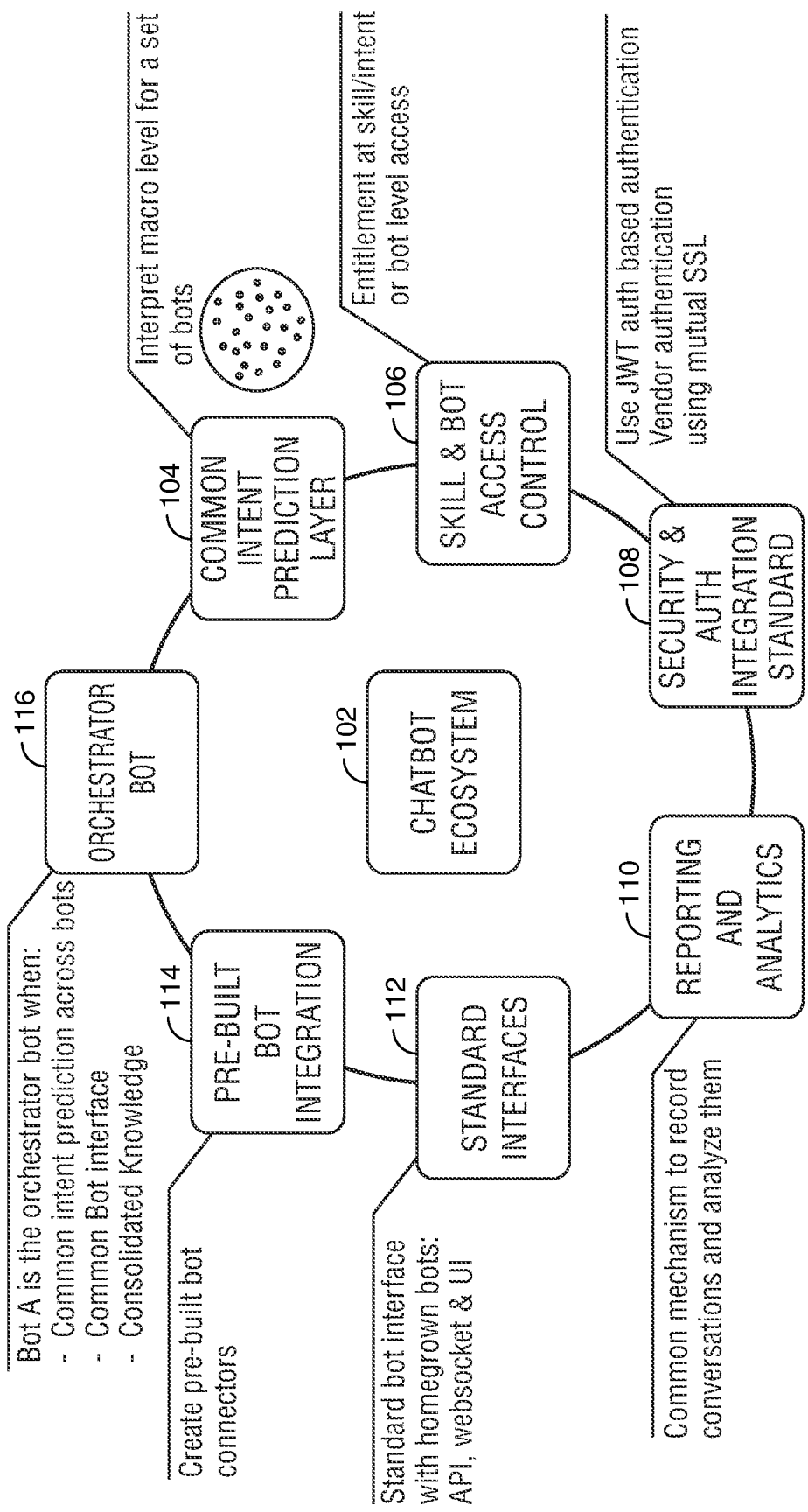
FIG. 1 shows an illustrative diagram in accordance with principles of the disclosure.

Apparatus and methods for executing a network of chatbots using a combination approach is provided.

Problem Statement

There are entities that maintain multiple chatbots and/or interact with vendor chatbots and/or chatbots external to the entity. Previously, each chatbot was accessed individually and interaction between chatbots was typically unavailable. Therefore, it was cumbersome to conduct communications that require multiple chatbots. Additionally, a chatbot was not able to retrieve knowledge included in another chatbot. These faults, as well as additional faults, resulting from lack of communication between chatbots may limit the capabilities of the chatbots.

Solutions

As chatbots become more common in the commercial world, it would be desirable for the chatbots to be able to communicate with one another. Such communication between chatbots may strengthen and increase the current capabilities of the chatbots. However, there may be challenges associated with creating a network of chatbots, also referred to herein as a bot of bots.

Challenges to Solutions

Conventional systems include numerous single bots. Each single bot understands a specific limited number of intents. For example, a first bot is able to understand, and respond to, 100 intents, which are associated with more than 100 utterances. A second bot is able to understand, and respond to, 140 possibly different intents, which are associated with more than 140 utterances.

Each bot is associated with a specific domain—i.e., a logical grouping. For example, a first bot may be associated with human resource requests. The human resources bot may be trained to accept and respond to queries that can be included in the human resource domain. Examples of such human resource queries may include "What are the deductions to my paycheck?"

A second bot can be associated with technical support requests. The technical support bot may be trained to accept and respond to queries that can be included in the technical support domain. Examples of such technical support queries may include "I need help setting up my video conferencing system" and "My email is not working."

A third bot can be associated with investment requests. The investment bot may be trained to accept and respond to queries that can be included in the investment domain. Examples of such investment queries may include "What is the opening price for a specific stock?"

The bot of bots model may be designed to understand all intents associated with all bots with which the bot will communicate. For example, the bot of bots model may combine a first bot that is able to understand, and respond to, 100 intents with a second bot that is able to understand, and respond to, 140 intents. As such, the bot of bots may be designed to understand all 240 intents. When combining models into a grouped model, the intents may not be logically grouped.

This is a difficulty because a key to efficient building of a model may be to keep intents logically grouped. When intents are not logically grouped, the model may misbehave—i.e., the model may produce erratic results.

Training a model is an ongoing, continually-developed, process. As more domains are added to a combined model, this challenge is compounded as the ecosystem of models needs to parse a larger number of intents, each of which may be assigned to a unique group of utterances. For example, when increasing the number of domains in the model from two domains to five domains, the ecosystem of models may need to parse a larger number of intents as well as parse additional intent categories.

Solution 1

The system maintains the front end as an open front to queries from various domains. However, the bots at the backend are logically grouped by domain.

In this solution, each bot may include the top n number of queries from other bots. However, the top n number of intents may be labeled as "not from this bot."

In somewhat analogous terms, there are two types of bots. One type of bot may be a "know it all" manager bot. The "know it all" manager bot may perform all of the parsing on its own. Such a manager bot may only access information that is included in its own bot. Another type of bot may be a "delegator" manager bot. The "delegator" manager bot corresponds to this solution. Such a "delegator" manager bot may, at times, access data within its own bot. At other times, the "delegator" manager bot may delegate the requests, or access knowledge included in other bots to complete a request.

The reason why this system operates efficiently with respect to simplicity of user interaction and communications is because the system is not suffering the complexity and extent of fully understanding two different universes. Most of the time, if a bot is trained to understand two different domains, the bot becomes resource overloaded. When a bot becomes resource overloaded, the chance of error is higher.

Solution 2

The system maintains the front end as an open front to all sorts of queries, however the bots at the backend are logically grouped.

In this solution, the query is sent to each of the bots. Each bot parses the query and then presents an answer, along with a percentage of accuracy, to the front end. In this scenario, the front end may provide a listing of answer results to the user. The user may select which result is most appropriate. Upon selection, the user may be directed to the selected bot. The challenge in this approach may include presenting the listing to the user in a user interface that does not overwhelm the user. As such, only a minimal number of intents may be presented to the user.

Highlights of Solution 1 and Solution 2 as Compared to One Another

Highlights of solution 1 include an AI/ML-powered orchestrator bot that takes responsibility. Highlights of solution 1 also include simple presentation to the user. Highlights of solution 1 also include the system completing the best intent selection process for user. Highlights of solution 1 also include a higher change of inaccuracy. Highlights of solution 1 also include a proactive system that presents data to a user.

Highlights of solution 2 include absence of an orchestrator bot and the backend end processing of the orchestrator bot. Highlights of solution 2 include minimized processing time directed to determining which intent is the best intent. Highlights of solution 2 also include absence of a requirement for an interface that presents options to the user. Highlights of solution 2 also include a reactive system that reacts to user input. Highlights of solution 2 also include pushing to the user the responsibility for selecting best intent.

A network of chatbots residing on one or more hardware processors is provided. The network may include a user-facing router for receiving queries. The user-facing router may be an intelligent user-facing router. The intelligent user-facing router may work together with an algorithm to receive and route queries.

The network may also include a plurality of chatbots operating in the network. Each chatbot, included in the network, may identify a single logical grouping of a domain. As such, each chatbot may include data relating to intents and queries that correspond to a single domain. Examples of domains may include technical support, human resource support and investment support.

Each chatbot may also identify a limited number of intents from each other chatbot included in the plurality of chatbots. The limited number of intents may be a predetermined number of intents. Each chatbot may also communicate with each other chatbot included in the plurality of chatbots. The plurality of chatbots may communicate with one another using a universal protocol.

In some embodiments, when the user-facing router receives a query from a user, the router may receive the query with an associated domain. The router may select a first chatbot based on the received domain. The router may direct the query to the first chatbot. The first chatbot may determine that the domain associated with the query is identified by a second chatbot. The first chatbot may identify an answer to the query within the limited number of intents that the first chatbot identifies regarding the second chatbot. The first chatbot may invoke an application programming interface (API) associated with the second chatbot in order to answer the query.

At times, after a predetermined number of communications between the user and the first chatbot, the first chatbot may transfer the query to the second chatbot. The predetermined number of communications may be three or any other suitable number.

In certain embodiments, when the user-facing router receives a query, the user-facing router receives the query with an associated domain. The user-facing router selects a chatbot, from the plurality of chatbots, based on the received domain. The user-facing router may direct the query to the selected chatbot. The selected chatbot may determine that the domain associated with the query is incorrect. The selected chatbot may identify a second chatbot based on a hook included in the query and identified within the selected chatbot. The hook may include a trigger word. The selected chatbot may transfer the query to the second chatbot. The second chatbot may invoke an API to provide an answer to the query.

In some embodiments, when the user-facing router receives a query from a user, the user-facing router receives the query with an associated domain. The user-facing router may select a chatbot from the plurality of chatbots based on the received domain. The selected chatbot may determine that the domain associated with the query is incorrect. The selected chatbot may identify a second chatbot based on a trigger word included in the query and identified within the selected chatbot. The selected chatbot may transfer the query to the second chatbot. The selected chatbot may maintain control of the communications with the user. The selected chatbot may serve as a conduit between the user and the second chatbot.

After a predetermined number of communications between the user and the selected chatbot, the selected chatbot may transfer the query to the second chatbot. The predetermined number of communications may be three or any other suitable number. The second chatbot may invoke an API to provide an answer to the query.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a chatbot ecosystem. A chatbot ecosystem may be an ecosystem that includes various components of chatbots and how the chatbots operate together within a single ecosystem.

Container 102 shows a chatbot ecosystem. Various components of the chatbot ecosystem are shown surrounding container 102.

The components of the chatbot ecosystem may include an orchestrator bot, shown at 116. An orchestrator bot may be a bot that directs an incoming query to a domain-based bot. The domain of the domain-based bot may correspond to the domain of the incoming query.

In a training environment, the orchestrator bot may receive labeled training data. As such, the orchestrator bot may receive a query that has already been labeled with a domain.

In a production environment, the query may be received at the orchestrator bot with or without a labeled domain. In the event that the query is received labeled with a domain, the system may utilize machine learning and/or artificial intelligence to determine whether the domain with which the query was labeled is the correct domain. In the event that the query is received without a domain, machine learning and/or artificial intelligence at the orchestrator bot may determine a domain appropriate for the query.

In some embodiments, the orchestrator bot may be associated with a first domain and have limited knowledge of other domain bots. In such embodiments, the orchestrator bot may also be a domain bot, yet the orchestrator bot may have knowledge of other bots. In the event that a query is received at such an orchestrator bot, the orchestrator bot may answer the query when the query is associated with the same domain as the bot. In the event that a query is received at such an orchestrator bot, the orchestrator bot may also answer the query if the answer to the query is included within the limited knowledge of other bots included in the orchestrator bot. In the event that a query is received at such an orchestrator bot, the orchestrator bot may also retrieve knowledge from a bot associated with a different domain. In the event that a query is received at such an orchestrator bot, the orchestrator bot may channel the query to a different bot associated with a domain that is associated with query.

A bot may be an orchestrator bot when the bot includes common intent prediction across bots. As such, a bot may be an orchestrator bot when each bot included in the ecosystem includes a common intent prediction layer. Common intent prediction layer may be the layer included in each bot that enables each bot to generate a prediction for a query. An orchestrator bot may be able to direct a query to the appropriate domain specific bot for intent prediction.

A bot may also be an orchestrator bot when the bot includes and/or has knowledge regarding a common bot interface. The common bot interface may enable a bot to interface with one or more other bots.

A bot may also be an orchestrator bot when the bot includes consolidated knowledge. Consolidated knowledge may include various small amounts of knowledge regarding other bots. As such, Bot A, which may know a universe of data regarding domain A, may include small amounts of knowledge regarding domain B, domain C and domain D.

Figure 3:
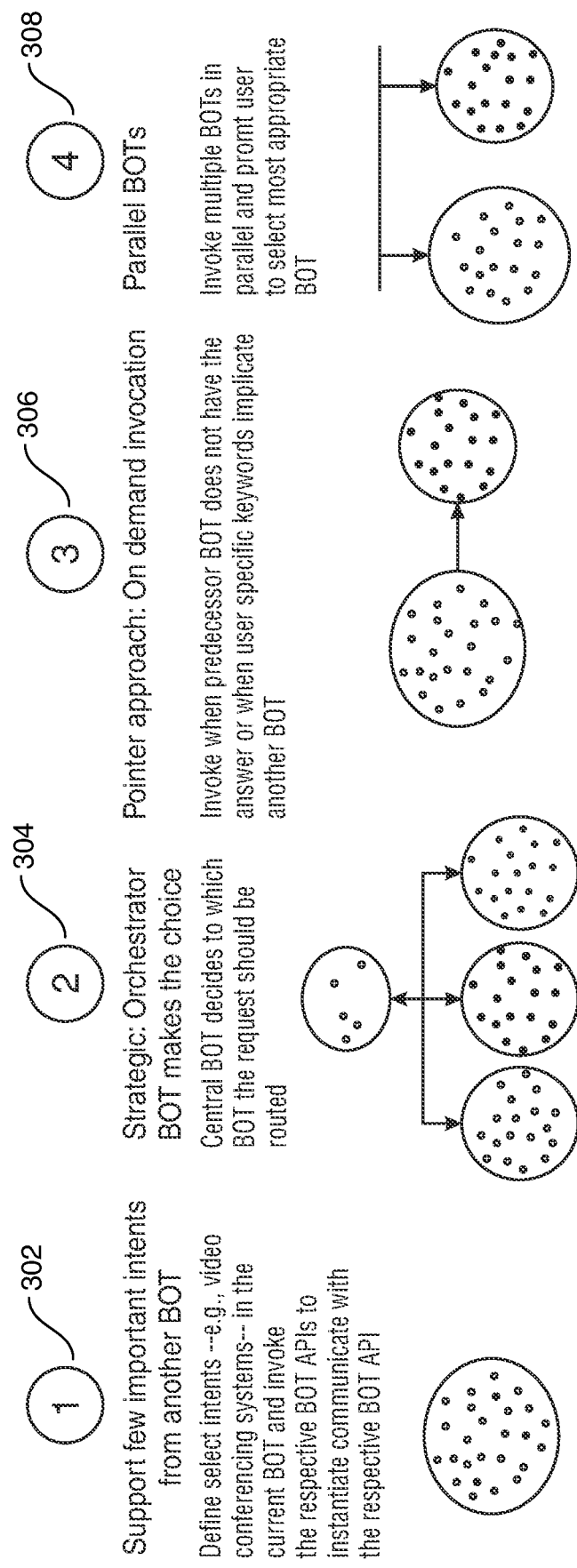
FIG. 3 shows another illustrative diagram in accordance with principles of the disclosure.
Figure 4:
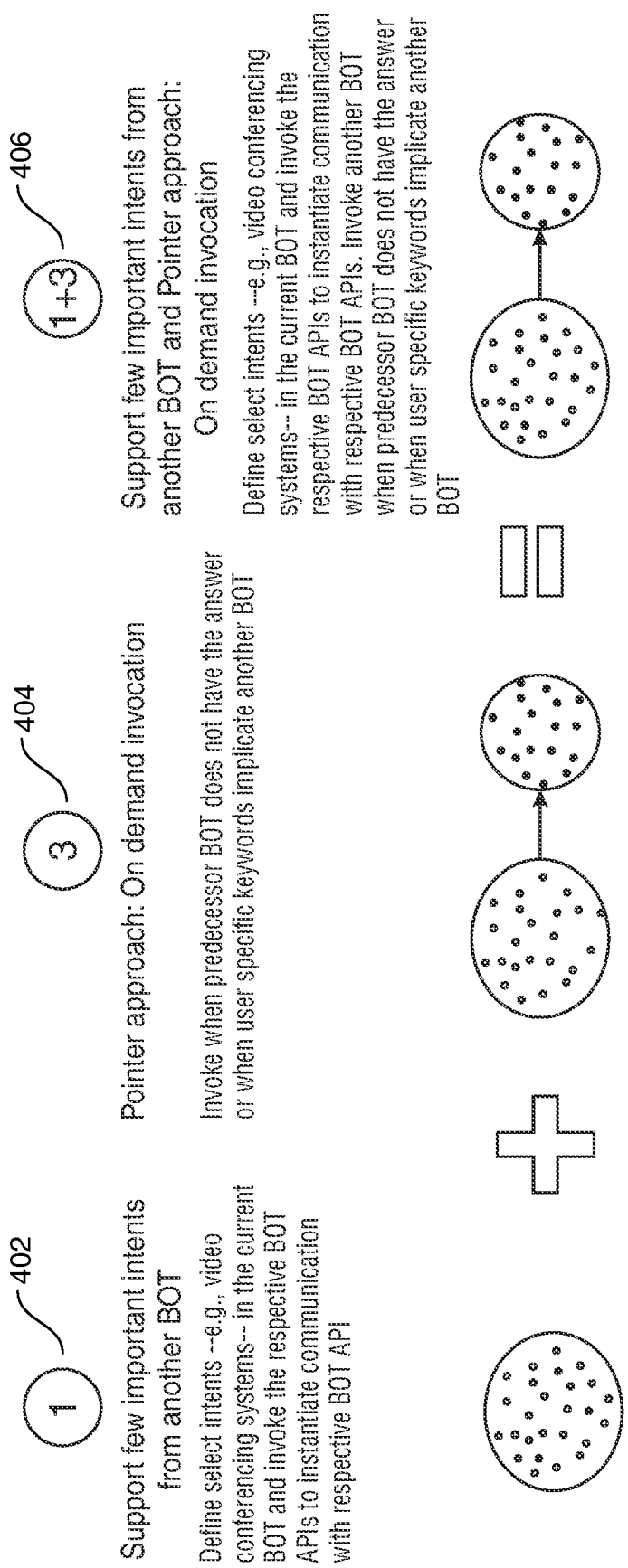
FIG. 4 shows still another illustrative diagram in accordance with principles of the disclosure.

The components of the chatbot ecosystem may include a common intent prediction layer, shown at 104. The common intent prediction layer may be a logic layer that interprets and determines the intent of a prediction. The common intent prediction layer may interpret macro level predictions for a set of bots. The common intent prediction layer may utilize one or more processes for predicting intents. Examples of such processes are shown in FIGS. 3 and 4.

The components of the chatbot ecosystem may also include a security and auth-integration standard, shown at 108. The security and auth-integration standard may include a layer of security and authorization required and executed prior to a user and/or bot accessing specific data. The security and auth-integration may be bot specific and/or user specific. As such, the security and authorization layer may allow users and/or bots to access appropriate data. However, the security and authorization layer may prevent users and/or bots from accessing data to which the users and/or bots are restricted from accessing.

For example, a user may have access to all of the data included in bot A and have access to only a portion of the data included in bot B. As such, the security and auth-integration layer may allow the user to access all of the data in bot A, allow the user to access the portion of bot A to which the user has permission to access and prevent the user from accessing the portion of data included in bot B to which the user is restricted from accessing. In another example, bot A may have access to bot B and have access to only a portion of the data included in bot C. As such, the security and auth-integration layer may allow bot A to access bot B, allow bot A to access the portion of data included in bot C to which bot A has permission to access and prevent bot A from accessing the portion of data included in bot C that bot A is restricted from accessing.

At times, the permissions of bots and/or users may contradict one another. In some embodiments, the security and auth-integration layer may implement the most restrictive permissions. For example, bot A may be allowed to access bot B, however, an exemplary user X accessing bot A may be restricted from accessing bot B. As such, when user X is accessing bot A, bot A may be restricted from accessing bot B. In other embodiments, the security and auth-integration layer may implement the least restrictive permissions. For example, bot A may be allowed to access bot B, however, user X accessing bot A may be restricted from accessing bot B. As such, when user X is accessing bot A, user X may be allowed to access bot B.

The security and auth-integration standard may utilize JavaScript Object Notation (JSON) Web Token (JWT) to implement these security standards. The security standards may be an enterprise application programming interface (API) management solution-enabled vendor authentication. The enterprise API management solution may include a centralized API catalog, centralized API management, centralized API standards and centralized API policies. The security standards may utilize a mutual secure sockets layer (SSL). An SSL may be a computing protocol that utilizes encryption to secure data transmitted over a network, such as the Internet.

The components of the chatbot ecosystem may also include a reporting and analytics layer, shown at 110. The reporting and analytics layer may include one or more mechanisms for recording conversations and analyzing the recorded conversations.

The components of the chatbot ecosystem may also include a standard interfaces layer, shown at 112. The standard interfaces layer may create a standard or universal language for bot-to-bot communications. As such, the application programming interfaces (APIs), WebSockets and user interfaces may follow a predetermined protocol. Therefore, the communications between bots are seamless and preferably remove a translation layer between bots.

The components of the chatbot ecosystem may also include pre-built bot integration, shown at 114. Pre-built bot connectors may be connectors that connect bots. The pre-built bot connectors may be instrumental in implementing a standard interfaces layer. Pre-built bot connectors may provide a conversion layer between the bots within a bot network.

Figure 2:
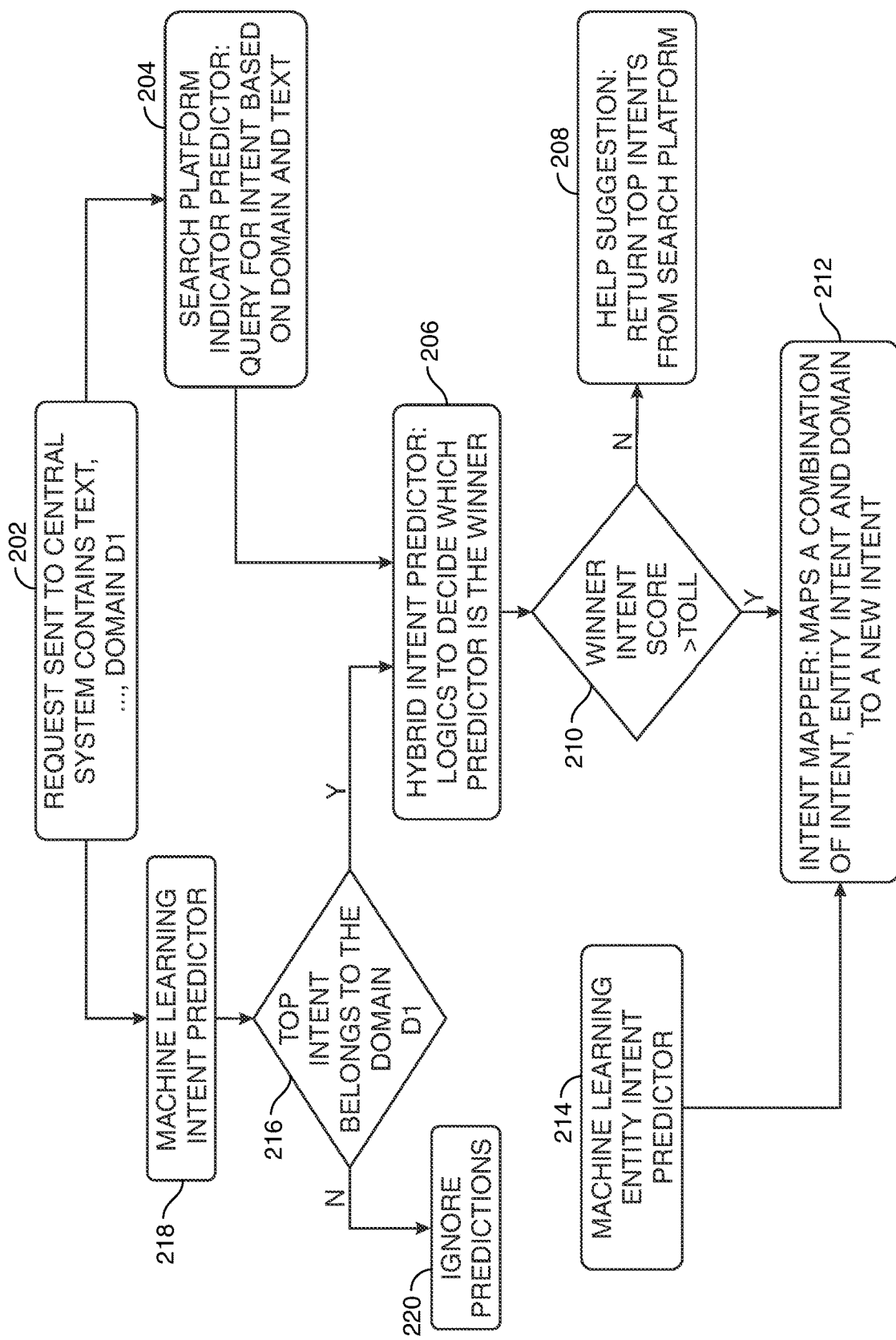
FIG. 2 shows an illustrative flow chart in accordance with principles of the disclosure.

FIG. 2 shows an illustrative flow chart. The illustrative flow chart shows a process of a request being transmitted to a central system. The central system, utilizing a plurality of various components, identifies an intent corresponding to the request. The request may also be linked to a domain, such as D1. In alternative embodiments, the request may also be linked to one or more domains. The request may not be linked to a domain.

At step 202, a request may be transmitted to a central system. The request may include text. The text may be the output of a voice-to-text system, a request transmitted via email or a textual request transmitted via any other suitable process.

It should be appreciated that the text may be processed through a normalization module prior to being received at the central system.

The normalization module may transform the text based on a set of rules. There may be a plurality of normalization modules. The plurality of normalization modules may include a default normalization module and one or more domain-specific normalization modules. The default normalization module may transform the text to central-system-readable text based on a default set of rules. The domain-specific normalization module may transform the text to central-system-readable text based on a set of rules specific to each domain. For example, an investment domain may normalize text using acronyms that are specific to investment queries, while a help desk domain may normalize text using acronyms specific to help desk queries.

Upon receipt of the request, also referred to herein as a query, steps 204 and 218 may be actuated. It should be appreciated that steps 204 and 218 may be executed concurrently. The concurrent execution of both steps 204 and 218 may enable intent prediction using two or more different algorithms. Upon completion of both intent prediction algorithms, the hybrid intent predictor, shown at 206, may determine which intent prediction algorithm produced a more accurate response. Hybrid intent predictor 206 may also attempt to combine the two results from both algorithms to present a combined intent prediction.

Step 204 shows the search platform intent predictor predicting the intent of the query based on the domain and/or the text of the query. The search platform intent predictor may be Solr® or any other suitable predictor. The search platform intent predictor may present one or more suggestive intents. The search platform intent predictor may be domain specific. As such, the suggestive intents may correspond to the domain that was originally linked to the received query. The suggestive intents may be based on keywords appropriate to the corresponding domain.

Step 218 shows the machine learning intent predictor predict the intent of the query based on machine learning and/or artificial intelligence. The machine learning intent predictor may utilize a large number of queries and intents to learn the knowledge of how to accurately identify the domain and intent of a query. As such, the input into the machine learning intent predictor may not require a domain. Previously, models have been trained to understand a single domain. This is because the accuracy of the machine learning understanding the intent of the query is improved when a domain's queries and intents are logically grouped within a model. It should be appreciated that, because the machine learning intent predictor may know more than a single domain, the machine learning intent predictor may receive large amounts of training data in order to maintain the accuracy level of the predictions. The machine learning intent predictor may produce one or more intents for the query. The intents may be ranked based on predicted accuracy.

Step 216 shows an interceptor module for assessing the accuracy of the highest-ranking intent prediction predicted by the machine learning predictor. The assessing includes determining whether the highest-ranking intent predicted by the machine learning intent predictor is found in a list associated with the domain that was linked to the query. In the event that the highest-ranking predicted intent is not found in the list associated with the domain that was linked to the query, the central system ignores the prediction(s), as shown at 220. In the event that the highest-ranking predicted intent is found in the list associated with the domain that was linked to the query, the highest-ranking one or more intents may be passed from the machine learning intent predictor to the hybrid intent predictor, shown at 206.

The hybrid intent predictor, shown at 206, may use embedded logic to determine which predictor, whether the search platform intent predictor or the machine learning intent predictor, is the winner.

Step 210 shows another interceptor module assessing whether the intent received from the machine learning intent predictor is more accurate than the search platform intent predictor. In the event the winner intent is from the search platform intent predictor, the system may generate a help suggestion and return the top intents from the search platform, as shown at 208.

In the event that the winner intent is from the machine learning intent predictor, the system may process the query and intent at an intent mapper, as shown at 212. The intent mapper may also receive data from a machine learning entity intent predictor, as shown at 214. The machine learning entity intent predictor may predict an entity intent for the query. An entity intent may be a secondary intent, such as descendent intent. A predecessor intent may include various descendent intents. The descendent intents may be variations of the predecessor intent. An intent mapper may combine the intent predicted by the machine learning predictor, an entity intent predicted by the machine learning entity intent predictor and the domain that was linked to the request to a new intent. This new intent may or may not be the intent predicted by the machine learning predictor, the search platform intent predictor or the entity intent predictor. The new intent may be associated with a selected domain-specific chatbot. The selected domain-specific chatbot may be connected with the user that transmitted the request in order to attend the user's request. It should be noted that the domain associated with the selected chatbot may or may not be the domain that was originally linked to the query.

FIG. 3 shows a plurality of central system options. The plurality of central system options may include various ways for determining which chatbot, included in a network of chatbots, is most appropriate to answer a specific query. Also, the central system options include a process for transferring a query from a first chatbot to a second chatbot in the event that the first chatbot is associated with a domain that is different from the query's domain.

Section 302 shows option one for processing a query at a chatbot network. Option one may include supporting multiple intents from another bot. In such a system, a chatbot may support a few important intents from another chatbot. As such, in the event that a query associated with another domain is received at such a chatbot, the chatbot may be able to present an intent to the user if the intent is included in the relatively few important intents. This may improve upon previous systems at least because previously, in the event that a query was received at a chatbot that is not appropriate for the query, the chatbot would reject the query and the user would have to attempt to transmit the query to another chatbot.

An example of option one may include defining an intent like, for example, "how can I access my video conferencing system?" in a chatbot that primarily includes investment intents. Upon defining the correct intent, the chatbot may have the capability to invoke the respective chatbot application programming interfaces (APIs), such as the video conferencing system APIs, and instantiate communication with the respective chatbot APIs.

Section 304 shows option two for processing a query at a chatbot network. Option two may be a strategic approach where an orchestrator bot makes a choice. In such a network, the orchestrator bot may decide to which bot each request should be routed. In such a system, the orchestrator bot may not contain deep knowledge about the other bots within the network. Rather, the orchestrator bot may include sufficient knowledge to direct the request to the correct bot. This option may require a backtracking capability. This is because, in the event that request is directed to the wrong bot, the request may need to be backtracked to the orchestrator bot. The orchestrator bot may then need to reassign the request to the appropriate bot. The backtracking capability may require a smooth user interface so that a user is unaware of the transition from orchestrator bot to chatbot to orchestrator bot to another chatbot.

Section 306 shows option three for processing a query at a chatbot network. Option three may include a pointer approach for on-demand invocation. Such a system may include intercommunications between chatbots. Each chatbot in the system may be able to invoke another chatbot in the network. A descendent chatbot may be invoked by a predecessor chatbot. A predecessor chatbot may also be invoked by a descendent chatbot. The invocation may be executed when the predecessor chatbot does not have the answer to query or when a user specifies keywords that implicate another chatbot.

Section 308 shows option four for processing a query at a chatbot network. Option four may include a parallel bots approach. The parallel bots approach may include transmitting a request to multiple chatbots within a chatbot network. Each of the chatbots may process the query and produce an intent. Each of the intents may be presented by the chatbot with a level of accuracy that the chatbot determines that the intent answers the query.

In option four, more control is given to the user so that the user can decide to which chatbot the user would like to be directed. Artificial intelligence and machine learning may be used to rank the intents that were presented by the chatbots. The level of accuracy as determined by each chatbot may be a factor in ranking the intents to present to the user. Also, a user may be unable to review a number of intents greater than a predetermined threshold number of intents. A threshold number of intents may be five intents. Therefore, the user interface may only present the predetermined number of highest-ranking intents and not more.

FIG. 4 shows a central system combination option. The combination option may combine options one and three, also shown in FIG. 3. Option one, shown at 402, combined with option 3, shown at 404, may produce combination option one plus three, shown at 406. Combination option one plus three may be a chatbot network wherein one or more bots support a few important intents from one or more other bots within the network. Preferably, each bot can flexibly communicate with, or invoke, another bot. Each bot may communicate with another bot when the predecessor bot, or first bot, does not have the answer to a received query or when specific keywords, included in the received query, implicate another bot.

Such a combination bot system may prevent unnecessary handoffs, and associated difficulties, of a request from bot to bot. Rather, the combination bot system may enable a bot to handoff a request without requiring the request to be transmitted back to an orchestrator bot for remediation processing.

Such a combination bot may be built using the following method:
1. Perform data analysis on a first bot.
2. Select a top n number of intents from the first bot upon completion of the data analysis.
3. Define the top n number of intents in one or more other predecessor bots.
4. Define a hook, such as a trigger word, in the one or more predecessor bots. The trigger word will invoke the first, or most appropriate, bot.

In one exemplary example, a customer support or a help desk bot may include one thousand different intents. Those one thousand intents can be restricted to be invoked in 150 ways. The 150 ways may be stored in other bots, which are not directed to customer support or help desk, included in the network of bots. Hooks such as trigger words may also be stored in other bots in order for the other bots to be able to reference, and or communicate with the customer or help desk bot.

Thus, a system and method for executing a network of chatbots using a combination approach is provided. Persons skilled in the art will appreciate that the present invention can be practiced by other than the described embodiments, which are presented for purposes of illustration rather than of limitation. The present invention is limited only by the claims that follow.

What is claimed is:

1. A network of chatbots residing on one or more hardware processors, the network comprising:
    a user-facing router for receiving queries; and
    a plurality of chatbots operating in the network, each chatbot included in the plurality of chatbots is operable to:
    identify a single logical grouping of a domain;
    identify, and include, a limited number of intents from each other chatbot included in the plurality of chatbots, wherein the limited number of intents from each other chatbot comprises knowledge for enabling each chatbot to implicate another chatbot for servicing queries;
    invoke and instantiate communication with a plurality of application programming interfaces ("APIs") that support the limited number of intents; and
    communicate with each other chatbot included in the plurality of chatbots, wherein the plurality of chatbots communicate with one another using a universal protocol;
    when the user-facing router receives a query:
    the user-facing router receives the query with an associated domain;
    the user-facing router selects a chatbot, from the plurality of chatbots, based on the received domain;
    the user-facing router directs the query to the selected chatbot;
    the selected chatbot determines that the domain associated with the query is incorrect;
    the selected chatbot identifies a second chatbot based on a hook included in the query and identified within the selected chatbot, said hook comprising a trigger word; and
    the selected chatbot transfers the query to the second chatbot.

2. The network of chatbots of claim 1, wherein the user-facing router is an intelligent user-facing router.

3. The network of chatbots of claim 2, wherein the intelligent user-facing router works together with an algorithm to receive and route queries.

4. The network of chatbots of claim 1, wherein the second chatbot invokes an application programming interface (API) to provide an answer to the query.

5. A network of chatbots residing on one or more hardware processors, the network comprising:
    a user-facing router for receiving queries; and
    a plurality of chatbots operating in the network, each chatbot included in the plurality of chatbots is operable to:
    identify a single logical grouping of a domain;
    identify, and include, a limited number of intents from each other chatbot included in the plurality of chatbots, wherein the limited number of intents from each other chatbot comprises knowledge for enabling each chatbot to implicate another chatbot for servicing queries;
    invoke and instantiate communication with a plurality of application programming interfaces ("APIs") that support the limited number of intents; and
    communicate with each other chatbot included in the plurality of chatbots, wherein the plurality of chatbots communicate with one another using a universal protocol;
    when the user-facing router receives a query from a user:
    the user-facing router receives the query with an associated domain;
    the user-facing router selects a first chatbot, from the plurality of chatbots, based on the received domain;
    the user-facing router directs the query to the first chatbot;
    the first chatbot determines that the domain associated with the query is identified by a second chatbot; and
    the first chatbot identifies an answer to the query within the limited number of intents that the first chatbot identifies regarding the second chatbot;
    the first chatbot invokes an application programming interface (API) associated with the second chatbot in order to answer the query.

6. The network of chatbots of claim 5, wherein, after a predetermined number of communications between the user and the first chatbot, the first chatbot transfers the query to the second chatbot.

7. The network of chatbots of claim 6, wherein the predetermined number of communications is three.

8. The network of chatbots of claim 5, wherein the user-facing router is an intelligent user-facing router.

9. The network of chatbots of claim 8, wherein the intelligent user-facing router works together with an algorithm to receive and route queries.

10. A network of chatbots residing on one or more hardware processors, the network comprising:
    a user-facing router for receiving queries; and
    a plurality of chatbots operating in the network, each chatbot included in the plurality of chatbots is operable to:
    identify a single logical grouping of a domain;
    identify, and include, a limited number of intents from each other chatbot included in the plurality of chatbots, wherein the limited number of intents from each other chatbot comprises knowledge for enabling each chatbot to implicate another chatbot for servicing queries;
    invoke and instantiate communication with a plurality of application programming interfaces ("APIs") that support the limited number of intents; and
    communicate with each other chatbot included in the plurality of chatbots, wherein the plurality of chatbots communicate with one another using a universal protocol;
    when the user-facing router receives a query from a user:
    the user-facing router receives the query with an associated domain;
    the user-facing router selects a chatbot, from the plurality of chatbots, based on the received domain;
    the user-facing router directs the query to the selected chatbot;
    the selected chatbot determines that the domain associated with the query is incorrect;
    the selected chatbot identifies a second chatbot based on a trigger word included in the query and identified within the selected chatbot;
    the selected chatbot transfers the query to the second chatbot;

the selected chatbot maintains control of the communications with the user; and the selected chatbot serves as a conduit between the user and the second chatbot.

11. The network of chatbots of claim 10, wherein, after a predetermined number of communications between the user and the selected chatbot, the selected chatbot transfers the query to the second chatbot.

12. The network of chatbots of claim 11, wherein the predetermined number of communications is three.

13. The network of chatbots of claim 10, wherein the user-facing router is an intelligent user-facing router.

14. The network of chatbots of claim 13, wherein the intelligent user-facing router works together with an algorithm to receive and route queries.

15. The network of chatbots of claim 10, wherein the second chatbot invokes an application programming interface (API) to provide an answer to the query.

* * * * *